United States Patent [19]

de Panafieu et al.

[11] 4,165,222

[45] Aug. 21, 1979

[54] PROCESS FOR THE MANUFACTURE OF OPTICAL FIBERS WITH A RADIAL REFRACTIVE INDEX

[75] Inventors: Arnaud de Panafieu; Michel Villard; Christiane Baylac; Michel Favre, all of Paris, France

[73] Assignee: Thomson-CSF, Paris, France

[21] Appl. No.: 842,218

[22] Filed: Oct. 14, 1977

[30] Foreign Application Priority Data

Dec. 19, 1976 [FR] France ................... 76 31355

[51] Int. Cl.$^2$ .................. C03B 37/00; C03C 15/00; C03B 32/00
[52] U.S. Cl. .................. 65/2; 65/30 R; 65/31; 65/33; 65/DIG. 7
[58] Field of Search .......... 65/31, 33, DIG. 7, 60 D, 65/2, 63, 30 R; 106/50, 39.2

[56] References Cited

U.S. PATENT DOCUMENTS

| | | | |
|---|---|---|---|
| 3,758,284 | 9/1973 | Haller | 65/31 |
| 3,870,399 | 3/1975 | Randall et al. | 65/DIG. 7 |
| 3,881,945 | 5/1975 | Trojer et al. | 65/2 |
| 3,929,497 | 12/1975 | Munks | 65/33 X |
| 3,938,974 | 2/1976 | Macedo et al. | 65/60 D X |
| 4,060,401 | 11/1977 | Maries et al. | 65/DIG. 7 |
| 4,061,486 | 12/1977 | Jahn | 65/DIG. 7 |
| 4,097,258 | 6/1978 | Horikawa et al. | 65/31 X |

*Primary Examiner*—S. Leon Bashore
*Assistant Examiner*—Frank W. Miga
*Attorney, Agent, or Firm*—Oblon, Fisher, Spivak, McClelland & Maier

[57] ABSTRACT

A process yielding a glass blank in the form of a rod intended for drawing an optical fiber of the kind of self-focussing fiber i.e. having a radial refractive index gradient, having features (substantially transparency or transmission efficiency) lower than those of the fibers intended for long distance communication but sufficient for middle distance transmission, and which exhibits a lower cost than known processes. In a first stage a phase separation yields a "hard" phase (rich in silicon) and a "soft" phase (poor in silicon and rich in impurities) due to the drawing of a rod from a bath of molten glass through a cooling system having a strong temperature gradient and creating a radial refractive index gradient. In a second stage the soft phase is leached, eliminating the impurities contained in the soft phase but keeping safe the radial gradient. In a third stage a consolidation treatment is a pure annealing treatment rendering the hard phase more homogeneous.

9 Claims, 3 Drawing Figures

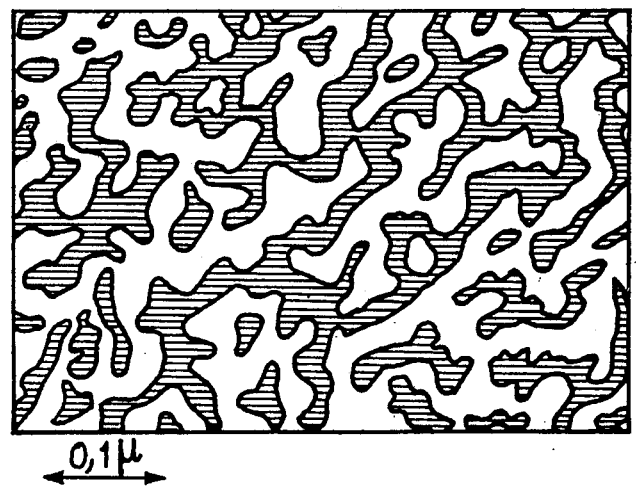
Fig. 1
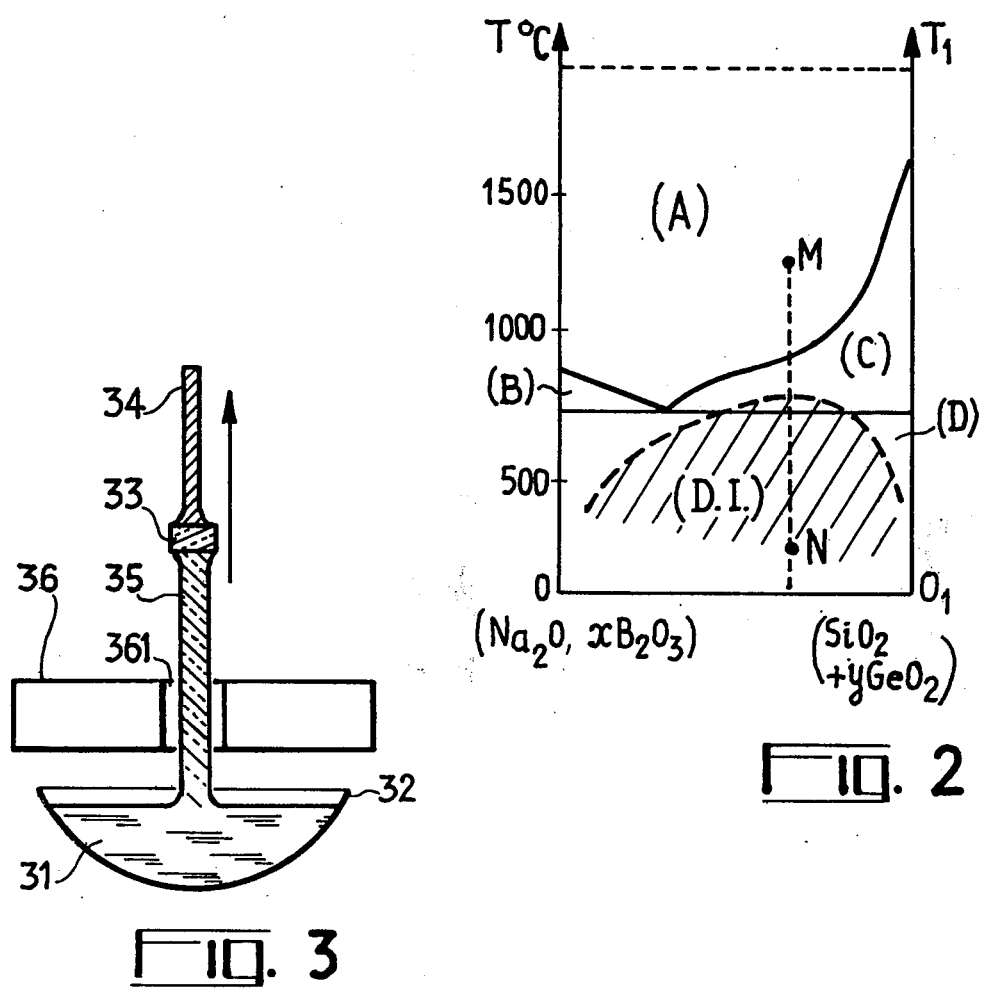
Fig. 2
Fig. 3

PROCESS FOR THE MANUFACTURE OF OPTICAL FIBERS WITH A RADIAL REFRACTIVE INDEX

This invention relates to light-conducting glass fibers and more particularly to so-called "self-focussing" fibers having a radial refractive index gradient, of the type used in particular in optical telecommunications.

So-called "cladded core" optical fibers are known. Optical fibers of this type consist of a central glass core of cylindrical geometry surrounded by an outer cladding which has a lower index of refraction than the central core. The light travels along the core, remaining "trapped" in the fiber as a result of the total reflection at the interface between the core and the cladding.

So-called "self-focussing" fibers are also known. In their case, the index of refraction decreases from the centre of the core (again cylindrical) to the periphery thereof. The law governing the decrease in refractive index along the radius of the cylindrical cross-section of the core is often pseudo-parabolic. If the radial gradient is sufficiently large in its absolute value, all the light rays (visible or invisible) are "refocussed" and, because they are unable to escape from the fiber, are propagated by it without any losses.

Known processes for the production of glass fibers enable two main problems in particular to be solved:

First problem:

Forming highly pure glasses containing less than $10^{-6}$ of certain light-absorbing impurities, particularly ions of so-called "transition" metals, such as iron, copper and nickel.

Second problem:

Obtaining the desired radial decrease in the index of refraction.

In practice, one known method of obtaining a glass fiber which satisfies the requirements of purity (solution to the first problem) and radial gradient (solution to the second problem) is to form a glass rod which satisfies these requirements. This rod is much larger in diameter than the actual fiber, the fiber being extracted by hot drawing from the rod and having the same purity as the rod (providing contamination by impurities is prevented during the drawing process). Similarly, the radial gradient of the fiber matches that of the rod. The present technology is already satisfactory so far as the drawing process is concerned, but, on the contrary, the present techniques of forming a glass rod which satisfies the above-mentioned requirements are attended by certain disadvantages.

So far as the processes using highly pure starting materials (less than $10^{-6}$ of impurities) are concerned, it is their high cost which is the principal disadvantage, as well as the risk of contamination during processing of the glass.

In other processes, less pure starting materials are used ($10^{-6}$ to $10^{-5}$ of impurities), a rod is formed from these starting materials and the glass of this rod is subjected to a purification treatment comprising several steps, including the step of separation into two solid phases and the step of leaching the phase which has collected most of the impurities. One major disadvantage of processes such as these arises out of the fact that, to obtain a radial gradient, a doping element has to be added after the purification treatment.

The addition of this doping element constitutes an additional step which complicates the process. A second disadvantage arises out of the fact that the doping element remains included in the glass on completion of the treatment and, for this reason, has to be extremely pure (less than $10^{-6}$ of impurities) which is all the more expensive insofar as, in this technology, the quantities of doping element are relatively large (of the order of 5% or more). A third disadvantage of using doping elements is attributable to faults in the distribution of the doping element in the glass which can give rise to significant losses in the transmission of light by the optical fiber.

The principal object of the present invention is to obviate these disadvantages.

According to the invention, there is provided a process for the manufacture of optical fibers having a radial refractive index gradient, yielding a glass blank having a larger diameter than the fiber and destined to the production of optical fibers, comprising:

A first stage consisting in mixing starting materials capable of entering into a glass composition showing the phenomenon of separation into two interconnected and continuous solid phases of different composition, said starting materials comprising at least oxides of boron, silicon, sodium and one oxide of a group consisting of germanium, titanium, phosphorus and aluminium oxides, said starting materials having an impurity level of under $10^{-5}$ calculated with molar proportions of oxides of so-called transition metals taken into account, said first stage subsequently comprising the preparation of a bath of molten glass;

a second stage comprising a first step of drawing said blank at a predetermined rate from said bath of glass through a cooling system having a predetermined temperature gradient, and a second step comprising at least one thermal annealing treatment;

a third stage comprising at least one leaching treatment to eliminate the phase containing most of the impurities and a heat treatment for consolidating the blank.

The invention will be better understood and other features thereof will become apparent from the following description in conjunction with the accompanying drawings, wherein:

FIG. 1 shows a cut of a material, illustrating the separation into two phases of the glass used in the process according to the invention.

FIG. 2 is a phase diagram.

FIG. 3 shows one example of the apparatus used for drawing a blank in the process according to the invention.

In the embodiment of the invention described hereinafter, the following oxides are used as starting materials in the molar proportions indicated (in %):

$SiO_2$ (35 to 70%)
$B_2O_3$ (17 to 42%)
$Na_2O$ (4 to 15%)

and at least one of the following complementary or "doping" oxides:

$Al_2O_3$ (0 to 5%)
$TiO_2$ (0 to 10%)
$P_2O_5$ (0 to 10%)
$GeO_2$ (0 to 15%)

In the example of a "doping" with $GeO_2$, the mixture of molten oxides behaves like a pseudobinary system of phases (liquid or solid):

$$Na_2O + xB_2O_3 \text{ with}$$

$SiO_2 + yGeO_2$ x and y being selected once and for all during preparation of the mixture.

FIG. 2 is one possible example of a phase diagram where the compositions are recorded on the abscissa, as in a binary diagram, and the temperatures on the ordinate.

The following regions for example will be present:
region (A) where there is a single liquid phase,
region (B) and region (C) where there is a liquid phase and a solid phase differing from one another in composition,
region (D) comprising one or two solid phases, depending on whether it is situated outside or inside an immiscibility region (D.I.) and which in addition encroaches on the adjacent regions.

The phenomenon of "phase separation" i.e. the appearance of two separate solid phases which penetrate into one another is obtained in particular by adopting the following procedure:

Starting from a point M of the region (A), i.e. from a molten bath of which the composition is represented by the abscissa of the point M and its temperature by the ordinate of the point M, the next step comprises cooling along a segment MN, for example by quenching. The temperature is slowly increased (thermal annealing), after which the temperature is stabilised. During this annealing treatment, two solid phases are formed. The structure obtained after annealing has the appearance shown in FIG. 1. In order to show up this appearance more clearly, a leaching chemical reaction was carried out beforehand to eliminate one of the solid phases. The network of porosities shown in black in FIG. 1 is of the "open" type, i.e. is formed by interstices communicating with one another and with the exterior of the specimen. In addition, it is by virtue of this feature that one of the solid phases may readily be completely eliminated. The same feature is utilised in accordance with the invention, together with the fact that most of the impurities collect in one of the phases that are subsequently eliminated, which enables a residual glass much purer than the initial glass to be obtained.

First stage of the process:

The first stage of the process comprises melting the mixture of oxides as defined above.

It will be recalled that these oxides must contain less than $10^{-5}$ of troublesome impurities, these troublesome impurities essentially consisting of so-called "transition" metals (iron, copper, nickel). The other impurities, such as water or the organic products, may be in a higher proportion.

Melting may be carried out by any conventional means which does not introduce any troublesome impurities. It is preferred to use a crucible of platinum alloyed with rhodium which is placed in a furnace capable of reaching a temperature of 1400° C. During melting, an oxidising atmosphere is maintained above the starting materials, for example by passing a stream of oxygen through the furnace.

Second stage of the process:

This stage comprises the step of shaping a blank and the thermal annealing step.

The glass is shaped into elongate blanks: solid or hollow rods (radial dimensions of the order of 5 mm representing either the diameter of a solid blank or the thickness of a hollow blank).

FIG. 3 shows an apparatus for shaping the blank by drawing from a bath 31 of molten glass accommodated in a crucible 32. A leader preform 33 so shaped as to assume the form of a solid or hollow rod enables a blank 35 having the required shape to be progressively drawn out from the bath. The preform 33 is mounted at the end of a rod which facilitates traction through the tunnel 361 of a cooler 36 giving a temperature gradient of high absolute value over a considerable temperature range (for example from 1000° C. to 450° C.). A double phenomenon occurs during the passage through the cooler:

1. An incipient phase separation as in the example illustrated in FIG. 2;
2. a radial variation in the chemical composition of each phase as a result of the variation in the rate of cooling between the periphery and the core of the blank (in the case of a tubular blank between the outer wall and the inner wall).

This double phenomenon is fundamental to the establishment of a radial index gradient in the blank during the following steps. The composition of the glass, its temperature on entering the cooler, the thermal cooling gradient and the drawing rate are all critical factors to the result obtained.

In a variant of the shaping process, the blank may be drawn through a hole formed in the base of the crucible (so-called die or extrusion process), if necessary by applying a pressure to the free surface of the bath.

For example, good results are obtained with the following parameters:
Temperature of the glass in the crucible: 1000° C.,
thermal gradient in the cooler: 15° C. per mm,
drawing rate: 20 mm per minute,
composition of the glass in mole %:
$SiO_2$: 57%
$B_2O_3$: 25%
$Na_2O$: 8%
$GeO_2$: 10%

The drawing step is followed by a thermal annealing step described hereinafter.

This step is necessary because the texture of separation of the phases (hard phase containing a large proportion of silica, soft phase containing a small proportion of silica) is too fine to enable the soft phase to be eliminated by selective extraction without breaking the rod. Accordingly, the object of the thermal annealing step is to coarsen this texture.

The thermal annealing step is carried out at a temperature of from 500° C. to 600° C. over a period ranging from one to several hours. As can be seen from the diagram shown in FIG. 2, it is preferable to select a low annealing temperature (barely above 500° C. in the present case) for obtaining two solid phases of very different composition. Experience has shown that purification is promoted in this way, the soft phase in this case collecting a much larger proportion of the troublesome impurities which are eliminated by subsequent extraction of the soft phase.

The mean transverse dimension of the texture of the two phases thus obtained is then of the order of a few hundred Angstroms. It may vary radially in the blank.

The thermal annealing treatment should not be continued for too long a period in relation to the empirically determined value, otherwise the phases are in danger of reaching their equilibrium chemical compositions at the temperature in question which would destroy the radial gradient obtained. Similarly, the annealing temperature should not be increased for the same reason.

Third stage of the process:
This stage comprises the following steps:
a. Extraction, rinsing and drying:

The annealed rod is cooled and then immersed in an acid solution (for example a three-normal aqueous HCL-solution with a temperature of 85° C.) to eliminate the soft phase. The depth of penetration of the acid is typically of the order of 2 mm in 24 hours, although to obtain complete extraction it is preferable to continue the attack for a longer period, for example for 48 hours for a solid cylindrical rod 5 mm in diameter.

During the attack of the soft phase by the acid, a gel is formed which can create sufficient stresses to break the rigid skeleton formed by the hard phase. Fractures such as these are avoided by starting from precise glass compositions (to be determined by trial and error) and by empirically determining the best "time-temperature" compromise for the thermal annealing step.

The rod which has become porous as a result of the extraction step has to be rinsed very carefully with deionised water. The blank is then dried by being kept for 3 to 4 hours in a gas stream at around 100° C. In order to eliminate the water present, the rod is heated in vacuo for around 20 hours at a temperature of the order of 550° C.

b. Consolidation treatment:

The object of this step is to close the pores of the rod by collapse of the walls of the interstices left by leaching of the soft phase.

The consolidation treatment is carried out by heating the glass to a temperature of from 100° to 900° C. over a period ranging from one to several hours. The temperature selected should be as low as possible and compatible with the required effect in order to avoid deformation of the rod. In effect, the aim is to obtain a uniform reduction in the volume of the rod.

This consolidation treatment is preceded and followed by optional steps:

1. Heat treatment before consolidation treatment:

The impurities existing in the hard phase are primarily in their reduced state after the stage of drying in vacuo. Depending upon the nature of these impurities, it may be desirable to modify their degree of oxidation. For example, the ferrous ion $Fe^{++}$, which has an absorption maximum for wavelengths of the order of 11,000 Angstroms, is particularly troublesome to the optical fibers, whilst the ferric ion $Fe^{+++}$ absorbs very little light for wavelengths ranging from 6000 to 11,000 Angstroms.

By virtue of the large surface-to-weight ratio (of the order of 100 $m^2$/gram) of the porous skeleton, it is easy to modify the degree of oxidation of the ions existing in the hard phase in known manner by carrying out heat treatments in controlled atmosphere.

2. Treatment of tubular rods after consolidation treatment:

In the case of a tubular rod, the tube may be closed by removing the inner wall by heating it in a flame. The advantage of the tubular rod during the second stage is due to the fact that it enables a greater mass of glass to be treated without any danger of breakage, the thickness of the glass between the outer wall and the inner wall being of the same order as the diameter of the solid rod. It is possible to increase the total length of optical fiber which can be drawn from a blank. For example, it is possible to reach lengths of several kilometers.

In order to obtain a glass fiber from the rod, one of the following two variants may be adopted:

First variant:

The fiber is directly drawn from the rod and the product obtained retains the radial chemical composition gradient and hence the refractive index gradient of the rod. The fiber can transmit light without cladding by virtue of its self-focussing properties.

Second variant:

In order to provide the fiber with mechanical and chemical protection, the rod is placed in a tube of glass rich in silica (of the order of 90%) of which the internal diameter is adjusted to the diameter of the rod. The glass of the envelope has physical properties very similar to those of the rod, in particular a drawing temperature of approximately 1400° C. Accordingly, a fiber cladded by the glass of the envelope is obtained by drawing. The glass of the envelope does not have to be purified because it is not used for the transmission of light, the light being guided in the core of the fiber by self-focussing.

The advantages of the invention include the reduction in cost attributable to the use of less pure starting materials (impurity level approximately 10 times higher than that tolerated at the final stage) for the same result, i.e. a given attenuation of the light signal transmitted at the glass fiber stage. A further reduction in cost arises out of the relative simplicity of the process by virtue of the fact that the radial decrease in the refractive index is obtained without any special treatment during drawing of the rod through a cooler. Finally, the transparency of the glass thus obtained is promoted by the fact that no doping agent is added after the extraction stage.

What we claim is:

1. A process for the manufacture of a glass blank used in the preparation of self-focusing optical fibers having a radial refractive index gradient, wherein said glass blank has a larger diameter than said fibers, from starting oxides which are capable of entering into a glass composition showing the phenomenon of separation into two interconnected and continuous solid phases of different composition, said starting oxides comprising oxides of boron, silicon, sodium and at least one oxide selected from the group consisting of germanium, titanium, phosphorous and aluminum oxides, and said oxides having an impurity level of under $10^{-5}$ calculated with molar proportions of oxides of transition metals taken into account, and which comprises the stages of I. Mixing said oxides; followed by melting said oxides into a molten bath;

II. Drawing said glass blank at a rate from said molten bath through a cooling system having a decreasing temperature gradient wherein said rate and temperature gradient are sufficient to cause an incipient phase separation in said glass blank and a radial variation in the chemical composition of each phase as a result of the variation in the rate of cooling between the periphery and the core of the blank due to the passage of said glass blank through said cooling system; followed by thermally annealing said glass blank; and III. Leaching said glass blank to eliminate most of the impurities; followed by heat consolidating said glass blank.

2. A process as claimed in claim 1, wherein said starting oxides are mixed in the following molar proportions:

from 35 to 70% of $SiO_2$
from 17 to 42% of $B_2O_3$ from 4 to 15% of $Na_2O$
and at least one of the following oxides, mixed in the following molar proportions with respect to the entirety of materials:
from 0 to 5% of $Al_2O_3$
from 0 to 10% of $TiO_2$
from 0 to 10% of $P_2O_5$
from 0 to 15% of $GeO_2$.

3. A process as claimed in claim 1, wherein said starting oxides have the following molar proportions:
57% of $SiO_2$
25% of $B_2O_3$
8% of $Na_2O$
10% of $GeO_2$.

4. A process as claimed in claim 1, wherein prior to the heat consolidation treatment, the process additionally comprises rinsing with deionised water, first drying at 100° C. in a gas stream and subsequently
drying in vacuo over a period of about 20 hours at a temperature of from 500° to 600° C.

5. A process as claimed in claim 1, wherein said heat consolidation treatment is carried out over a period of from one to several hours at a temperature in the range from 700° C. to 900° C.

6. A process as claimed in claim 1, wherein prior to the heat consolidation treatment the process additionally comprises heating said glass blank in a controlled atmosphere.

7. A process as claimed in claim 1, wherein said blank is drawn in a tubular shape and said blank is heated in the flame after the consolidation step to convert said tubular blank into a solid blank.

8. A process as claimed in claim 1, wherein after said heat consolidation step said blank is converted into a glass fiber.

9. A process as claimed in claim 1 wherein, after heat consolidation, said blank is placed in a tube of glass rich in silica wherein said silica content is about 90% and wherein the internal diameter of said tube is adjusted to fit the diameter of said blank;
and said blank is thereafter drawn to a glass fiber.

* * * * *

UNITED STATES PATENT AND TRADEMARK OFFICE
CERTIFICATE OF CORRECTION

PATENT NO. : 4,165,222
DATED : August 21, 1979
INVENTOR(S) : ARNAUD de PANAFIEU

It is certified that error appears in the above-identified patent and that said Letters Patent are hereby corrected as shown below:

Please insert the following priority data to read as Follows:

[30] -- October 19, 1976 [FR]   France ... 76 31355 --.

Signed and Sealed this

Thirtieth Day of October 1979

[SEAL]

Attest:

RUTH C. MASON
Attesting Officer

LUTRELLE F. PARKER
Acting Commissioner of Patents and Trademarks